United States Patent [19]

Chen et al.

[11] Patent Number: 5,812,371
[45] Date of Patent: Sep. 22, 1998

[54] ORIENTATION-ADJUSTABLE INFRARED TRANSCEIVER USED IN A NOTEBOOK TYPE COMPUTER

[75] Inventors: Mason Chen; Wei Wu; Tony Du; Mao-Shun Lee, all of Taipei, Taiwan

[73] Assignee: Compal Electronics, Inc., Taipei, Taiwan

[21] Appl. No.: 506,500

[22] Filed: Jul. 25, 1995

[51] Int. Cl.⁶ .............................. G06F 1/16; H04B 10/04
[52] U.S. Cl. .............................................. 361/686; 455/66
[58] Field of Search ...................................... 361/683, 686, 361/681, 680; 455/73, 88, 89, 90, 66; 250/338.1; 364/708.1; G06F 1/16

[56] References Cited

U.S. PATENT DOCUMENTS

| | | | |
|---|---|---|---|
| 4,687,924 | 8/1987 | Galvin et al. | 250/216 |
| 5,247,285 | 9/1993 | Yokota et al. | 345/169 |
| 5,287,245 | 2/1994 | Lucente et al. | 361/680 |
| 5,373,149 | 12/1994 | Rasmussen | 235/492 |
| 5,440,502 | 8/1995 | Register | 364/708.1 |
| 5,481,265 | 1/1996 | Russell | 341/22 |

FOREIGN PATENT DOCUMENTS 2226729  7/1990  United Kingdom .

*Primary Examiner*—Lynn D. Feild
*Attorney, Agent, or Firm*—Pro-Techtor International Services

[57] ABSTRACT

An orientation-adjustable infrared transceiver used in a notebook type computer. The infrared transceiver is installed in a container on a housing of the computer. A bottom of one end of the container is formed with a pivot socket and a lateral upper corner of the housing is formed with another pivot socket corresponding to the pivot socket of the container, whereby a pivot assembly is disposed in the pivot sockets to pivotally connect the container and the housing, permitting the container to be optionally rotated and located at one of multiple angles relative to the housing. Therefore, a user can adjust the orientation of the transceiving windows of the container according to the position of the object of the transceived infrared ray.

4 Claims, 4 Drawing Sheets

ORIENTATION-ADJUSTABLE INFRARED TRANSCEIVER USED IN A NOTEBOOK TYPE COMPUTER

BACKGROUND OF THE INVENTION

The present invention relates to an infrared transceiver used in a notebook type computer. The infrared transceiver is installed in a container on a housing of the computer. The container is permitted to be freely rotated and shifted relative to the housing so as to adjust the transceiving angle of the infrared transceiver according to the position of the object of the transceived infrared ray. The infrared transceiver is thus able to provide more efficient data transmission so as to increase the mobility of the operation and application of the notebook type computer.

It is known that an infrared transceiver has been more and more widely used in a notebook type computer to achieve the object of wireless data transmission. Conventionally, the infrared transceiver is fixedly installed in a back cover of the housing of the notebook type computer with the infrared transceiving windows directed rearward. When it is necessary to perform wireless data transmission between the notebook type computer and another notebook type computer or other equipments also having standard infrared transceivers such as wireless printer, wireless mouse, etc., it must be ensured that the infrared transceiving windows of both the computers are right directed to the transceiving ranges of each other so as to ensure the high quality data transmission. However, because the transmitting effective angle of the infrared diode used in the transceiver is quite narrow (within an about 15 degrees conic area) and the infrared transceiver is stationary, it is often necessary to move the entire notebook type computer to be aligned with the other one before operated.. As a result, such operation can be hardly performed in a convenient and reliable manner.

SUMMARY OF THE INVENTION

It is therefore a primary object of the present invention to provide an infrared transceiver used in a notebook type computer, which is installed in a container as a module on a housing of the computer. A bottom of an end of the container is pivotally connected with a lateral upper corner of the housing of the computer by a pivot assembly, whereby the container is permitted to be optionally rotated and located at one of multiple angles relative to the housing so as to adjust the orientation of the transceiving windows of the infrared transceiver according to the position of the object of the transceived infrared ray.

The present invention can be best understood through the following description and accompanying drawings, wherein:

DETAILED DESCRIPTION OF THE PREFERRED EMBODIMENT

Figure 1:
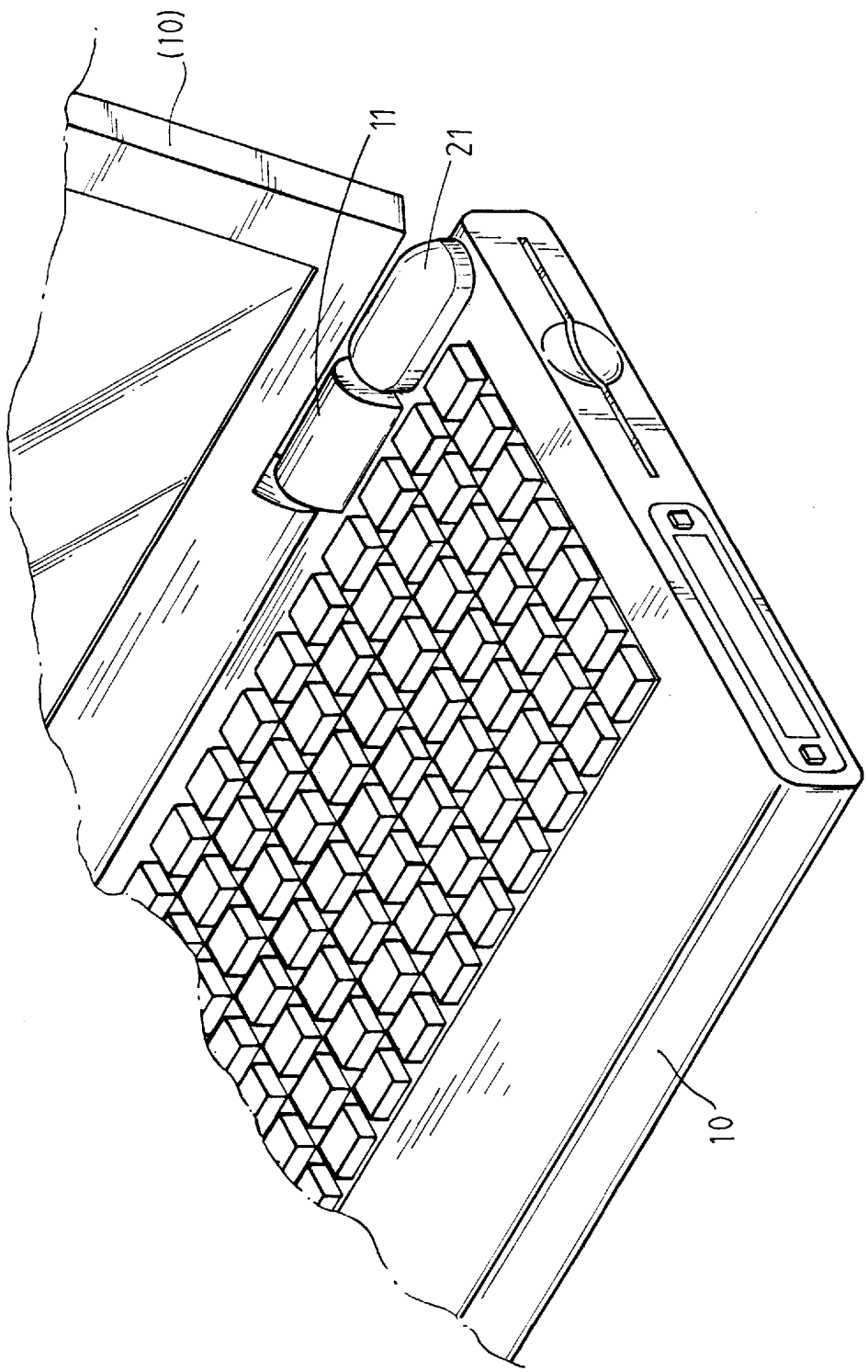
FIG. 1 is a perspective view showing that the infrared transceiver of the present invention is installed in a container at a connecting pivot of a housing of a notebook type computer.
Figure 2:
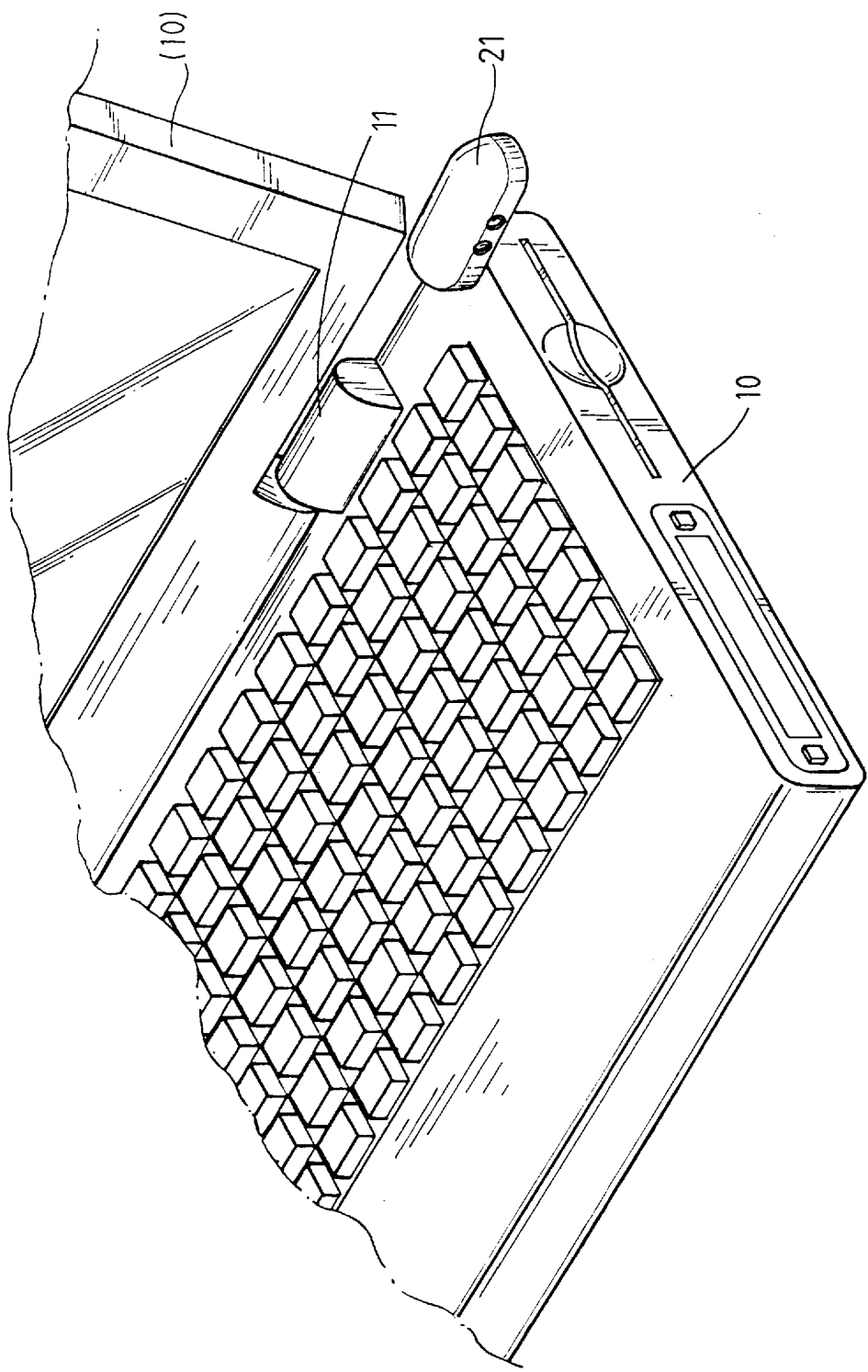
FIG. 2 is a perspective view showing that the infrared transceiver of the present invention is rotated outward from the connecting pivot of the housing.
Figure 3:
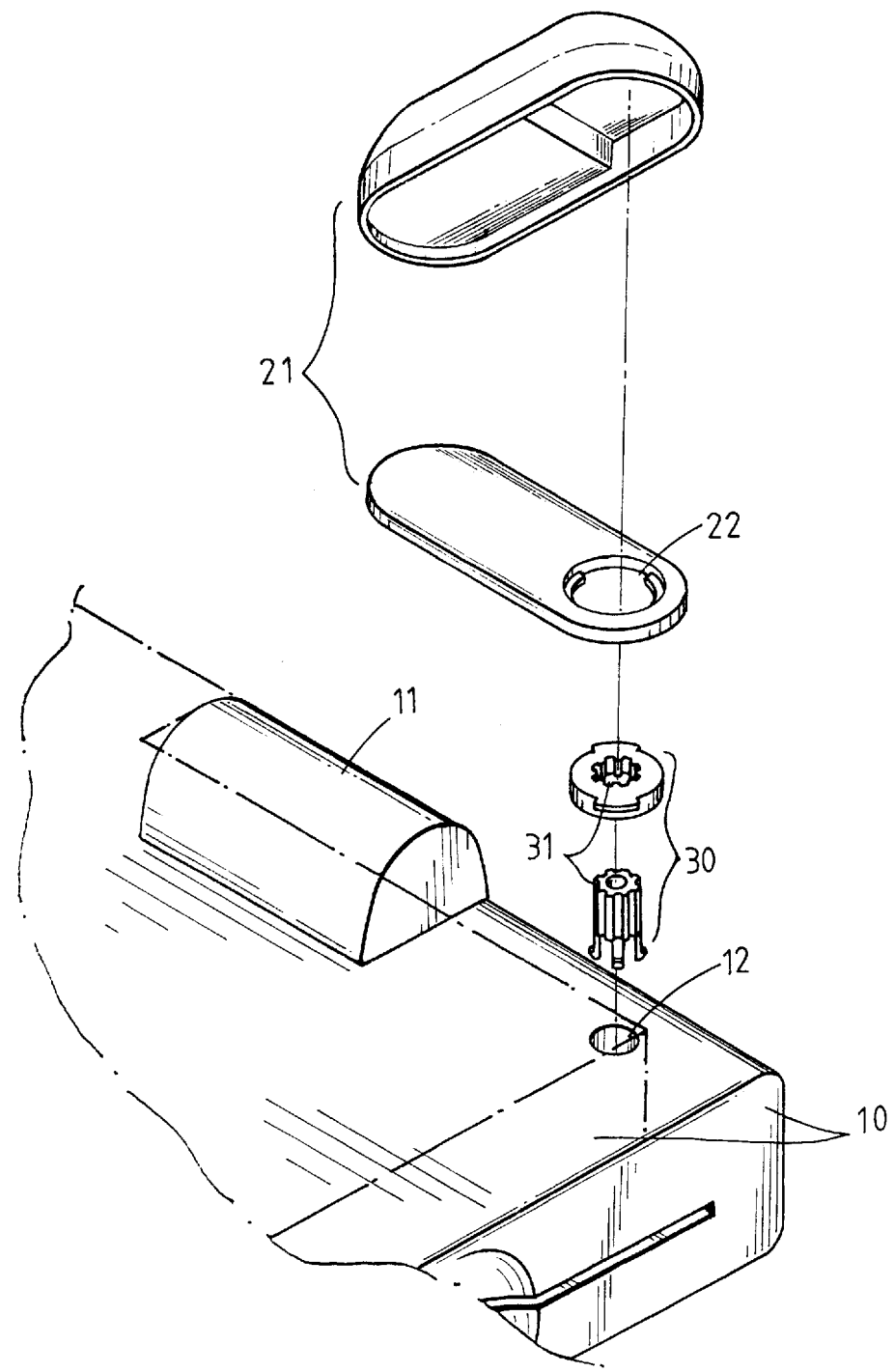
FIG. 3 is a perspective exploded view of the present invention.

Please refer to FIGS. 1 to 4. The infrared transceiver 20 of the present invention is installed in a container 21 at a connecting pivot 11 of a housing 10 of a notebook type computer. The bottom of the container 21 is formed with a pivot socket 22 and two transceiving windows 23 are formed on a lateral side of the container 21 for transceiving the infrared ray. In addition, another pivot socket 12 is formed on a lateral upper corner of the housing 10 of the computer, whereby a pivot assembly 30 is disposed in the pivot sockets 22, 12 to pivotally connect the container 21 and the housing 10. The pivot assembly 30 is designed with multiangle locating recess/key structure, whereby the container 21 can be optionally rotated and located at one of multiple angles. Therefore, the transceiver 21 is prevented from unexpectedly rotating.

Figure 4:
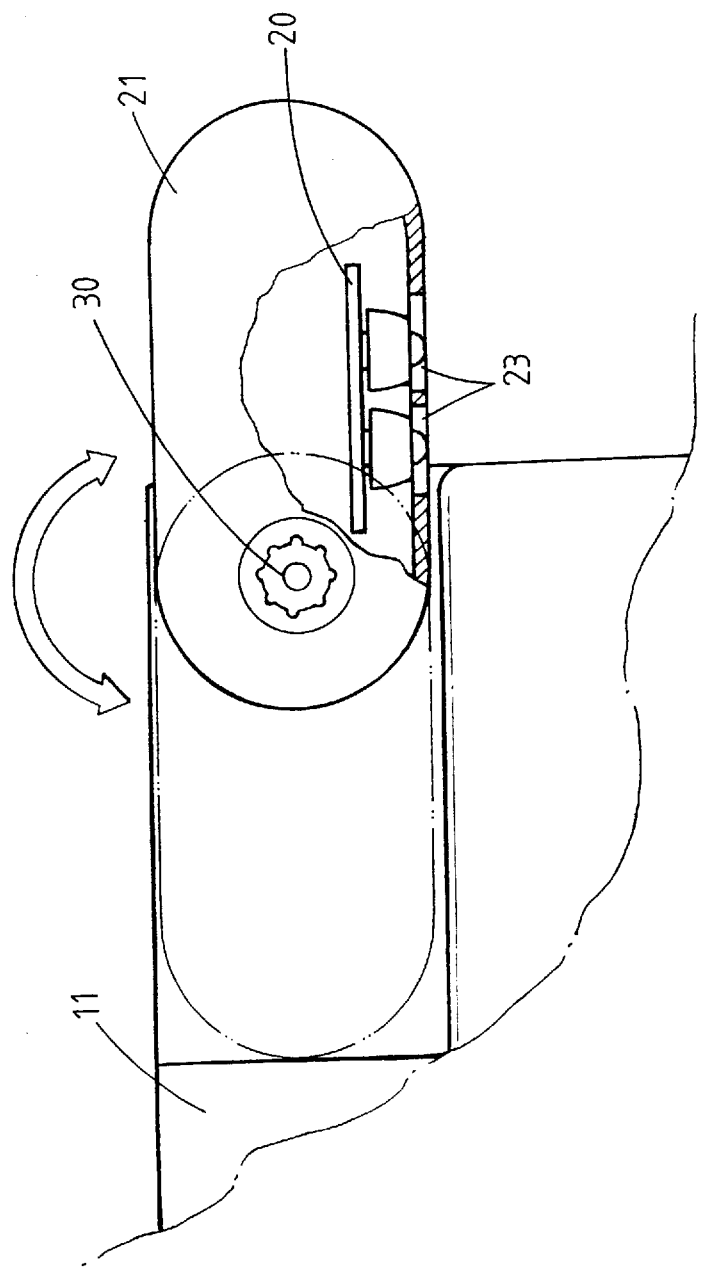
FIG. 4 is a top view showing the rotation and shift of the present invention.

According to the above arrangement, the container 21 can be rotated through 180 degrees about the pivot shaft 30 as well as shifted relative to the housing 10 of the notebook type computer as shown in FIG. 4. Therefore, a user can adjust the orientation of the transceiving windows 23 according to the position of the object of the transceived infrared ray. For example, the transceiving windows 23 can be directed forward, laterally or even rearward. As a result, the inconveniences caused by the stationary position of the infrared transceiver can be eliminated. In addition, the infrared transceiver 20 of the present invention is modularized for easy manufacturing and maintenance.

The present invention is able to eliminate the shortcomings existing in the conventional infrared transceiver of a portable computer. The above description and drawings are only used to illustrate a preferred embodiment of the present invention, not intended to limit the scope thereof. Many modifications of the preferred embodiment can be made without departing from the spirit of the present invention.

What is claimed is:

1. An orientation-adjustable infrared transceiver assembly comprising:

an infrared transceiver installed in a container, said container includes in a lateral side thereof at least one transceiving window, a bottom of one end of said container is pivotally connected to a pivot assembly, said pivot assembly includes receiving means installed in a housing of the portable computer, such that said container is pivoted to a non-active position wherein said container is stored within the external dimensions of the portable computer so as to not increase a volume occupied by the computer.

2. The infrared transceiver as claimed in claim 1, wherein:

said pivot assembly includes a first pivot socket affixed to said bottom end of said container, and said receiving means includes a second pivot socket corresponding to said first pivot socket, said pivot assembly pivotally connects said container and said housing.

3. The infrared transceiver as claimed in claim 1, wherein:

said container rotates about a pivot shaft so as change a position of said container relative to said housing.

4. The infrared transceiver as claimed in claim 2, wherein:

said pivot assembly includes a multiangle locating structure to rotate and fix said container at one of multiple angles, so that said transceiver is prevented from unexpectedly rotating.

* * * * *